(12) United States Patent
Minguez et al.

(10) Patent No.: US 11,002,880 B2
(45) Date of Patent: *May 11, 2021

(54) QUANTITATIVE ASSESSMENT OF PLATE TECTONIC MODELS

(71) Applicant: Chevron U.S.A. Inc., San Ramon, CA (US)

(72) Inventors: Daniel A. Minguez, La Canada, CA (US); Thomas Matthew Laroche, The Woodlands, TX (US); Keith R. Thomas, Sugarland, TX (US); Alan Morgan, Houston, TX (US); Elizabeth Anna Edwards Johnson, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 16/384,399

(22) Filed: Apr. 15, 2019

(65) Prior Publication Data
US 2019/0243027 A1    Aug. 8, 2019

Related U.S. Application Data

(63) Continuation of application No. 14/632,677, filed on Feb. 26, 2015, now Pat. No. 10,302,813.
(Continued)

(51) Int. Cl.
*G01V 99/00* (2009.01)
*G01V 11/00* (2006.01)
*G01V 1/28* (2006.01)

(52) U.S. Cl.
CPC ............ *G01V 99/005* (2013.01); *G01V 11/00* (2013.01); *G01V 1/282* (2013.01)

(58) Field of Classification Search
CPC combination set(s) only.
See application file for complete search history.

(56) References Cited

U.S. PATENT DOCUMENTS

| 9,921,338 B2 * | 3/2018 | Embid Droz ........ G01V 99/005 |
| 2004/0154821 A1 * | 8/2004 | Neuner ................... H02G 11/02 |
| | | 174/68.1 |

(Continued)

OTHER PUBLICATIONS

Best Real Time Model Development of an Oil Well Drilling System by Vega et al. (2012).
(Continued)

*Primary Examiner* — Mamadou L Diallo
(74) *Attorney, Agent, or Firm* — Sheppard, Mullin, Richter & Hampton LLP

(57) ABSTRACT

A method for quantitatively evaluating multiple computer-based plate tectonic models for application in a geographic region of interest, in some embodiments, comprises: selecting a plurality of computer-based plate tectonic models; using multiple computer-based plate tectonic models to generate one or more predictions for one or more geological parameters; obtaining observational data for each of said one or more geological parameters; for each of said one or more geological parameters, quantitatively comparing the predictions and the observational data to determine model rankings; and displaying said model rankings on a computer display.

19 Claims, 17 Drawing Sheets

Related U.S. Application Data

(60) Provisional application No. 62/103,608, filed on Jan. 15, 2015.

(56) References Cited

U.S. PATENT DOCUMENTS

| | | | | |
|---|---|---|---|---|
| 2011/0264430 | A1* | 10/2011 | Tapscott | G01V 99/00 703/10 |
| 2012/0272743 | A1* | 11/2012 | Sun | G01N 29/4418 73/784 |
| 2015/0127261 | A1* | 5/2015 | Aldea | G01V 1/302 702/2 |

OTHER PUBLICATIONS

3D Geological Modeling and its Application under Complex Geological Conditions by Shao Yan-Lina et al. (2011).
PCT International Preliminary Report on Patentability, International Application PCT/US2015/065205 dated Jul. 27, 2017, pp. 1-7.
Aslanian, Daniel, et al., "Brazilian and African Passive Margins of the Central Segment of the South Atlantic Ocean: Kinematic Constraints", Tectonophysics, 2009 vol. 468, pp. 98-112.
Cande, S.C., et al.; "Plate Kinematics of the South Atlantic: Chron C34 to Present"; Nov. 1988, Journal of Geophysical Research, vol. 93, No. B11, pp. 13,479-13,492.
Moulin, Maryline, et al.; "A New Starting Point for the South and Equatorial Atlantic Ocean"; 2010, Earth-Science Reviews, vol. 98, pp. 1-37.
Scotese, Christopher, et al.; "Plate Tectonic Reconstructions of the Cretaceous and Cenozoic Ocean Basins"; 1988, Tectonophysics, vol. 155, pp. 27-48.
Shaw, Peter R., et al.; "High-Resolution Inversion for South Atlantic Plate Kinematics Using Joint Altimeter and Magnetic Anomaly Data"; Mar. 1990, Journal of Geophysical Research, vol. 95, No. B3, DD. 2625-2644.
Torsvik, Trond H., et al.; "A New Scheme for the Opening of the South Atlantic Ocean and the Dissection of an Aptian Salt Basin"; 2009, Geophys. J. Int., vol. 177, pp. 1315-1333.
Unternehr, P., et al."; South Atlantic Fits and Intraplate Boundaries in Africa and South America"; 1988, Tectonophysics, vol. 155, pp. 169-179.
Williams, Simon E., et al.; "Full-Fit, Palinspastic Reconstruction of the Conjugate Australian-Antarctic Margins"; 2011, Tectonics, vol. 30, TC6012, pp. 1-21.
PCT International Search Report and Written Opinion, International Application PCT/US2015/065205 dated May 30, 2016.
Gutierrez, M.A. et al., Calibration and Ranking of Pore-Pressure Prediction Models, Dec. 1, 2006, The Leading Edge, Society of Exploration Geophysicists US, pp. 1516-1523 XP001501493.
Giuseppe Di Giulio et al., Exploring the model space and ranking a best class of models in surface-wave dispersion inversion: Application at European strong-motion sites, May-Jun. 2012, Geophysics, vol. 77, No. 3, p. BI47-BI66.

\* cited by examiner

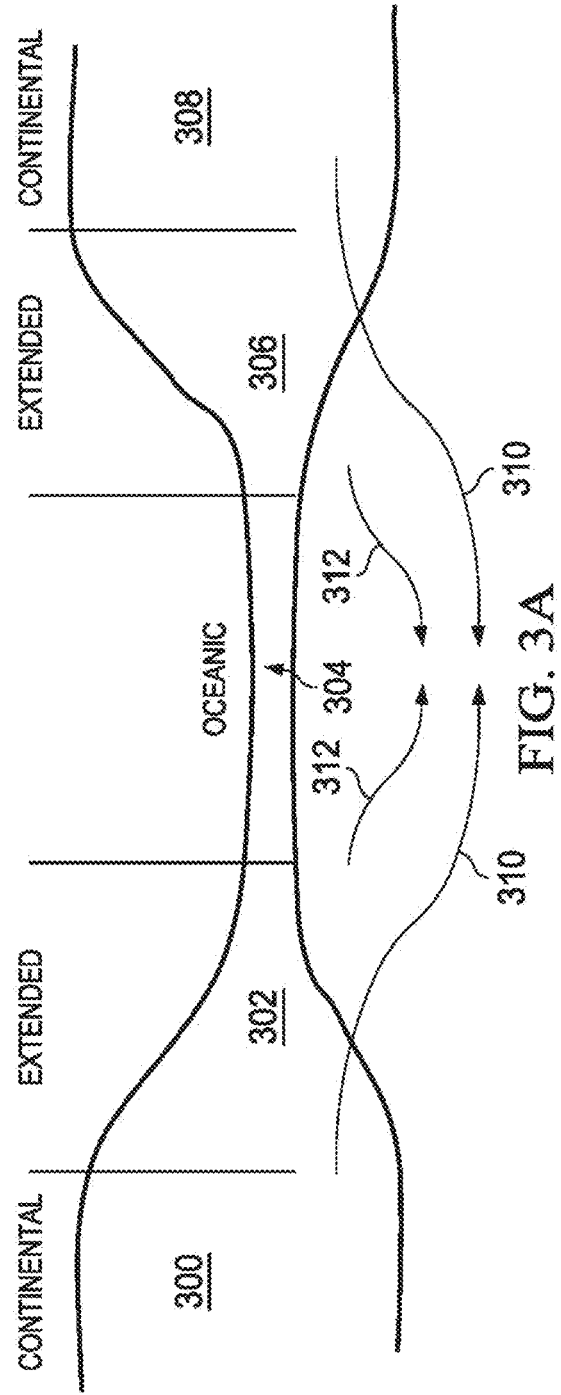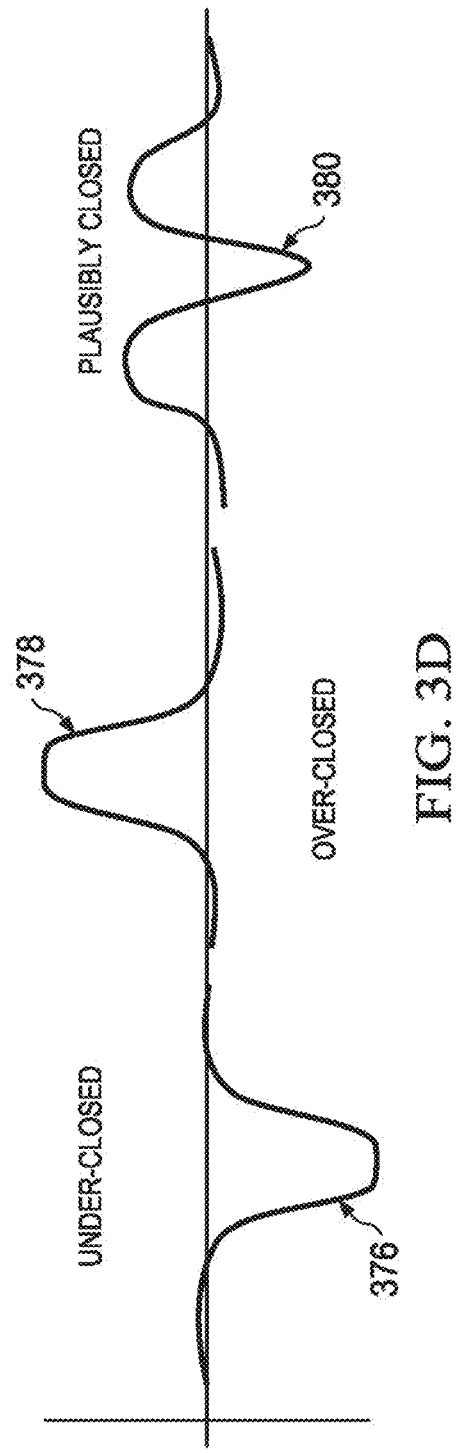

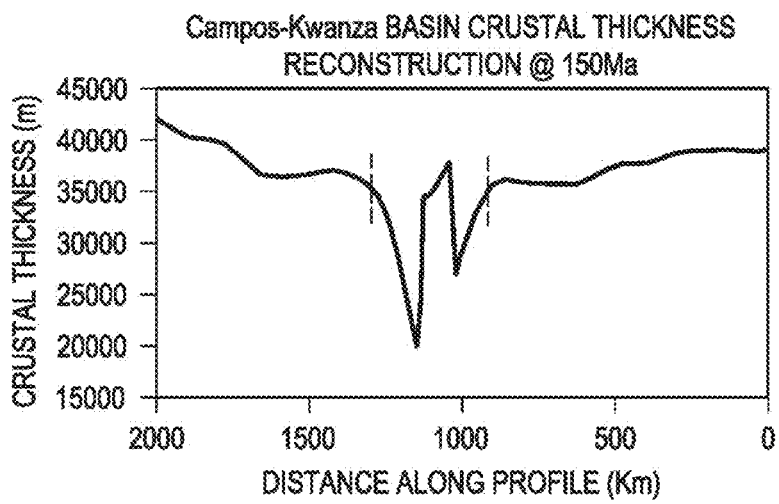
FIG. 3C1
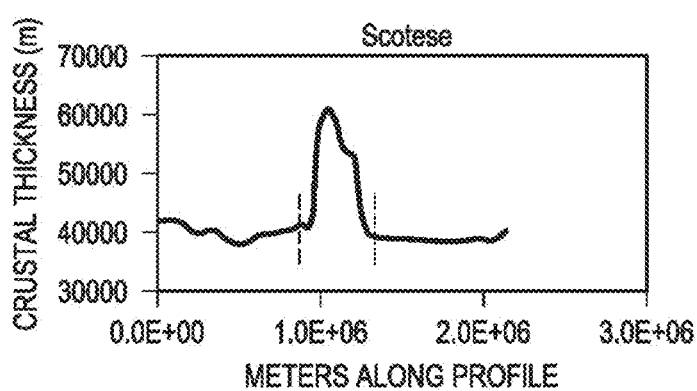
FIG. 3C2
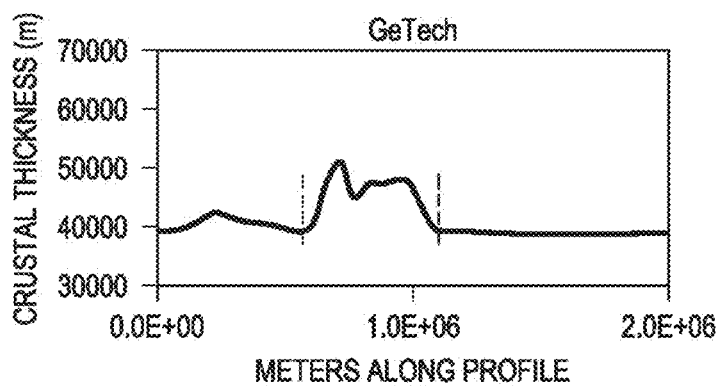
FIG. 3C3

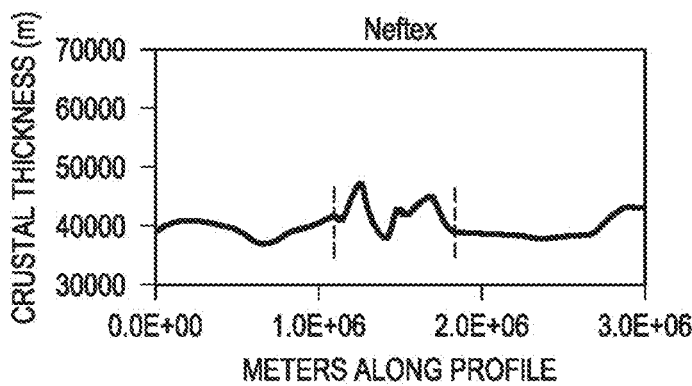
FIG. 3C4
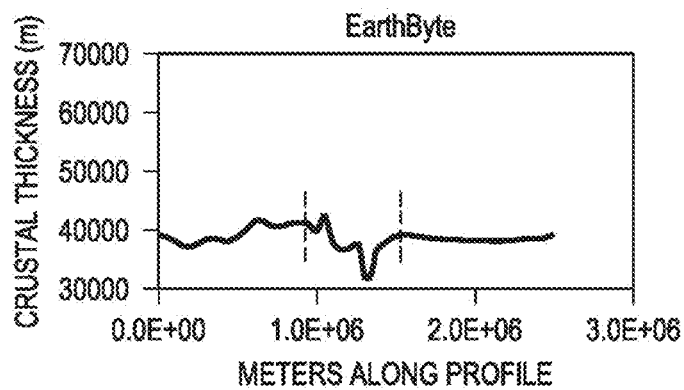
FIG. 3C5
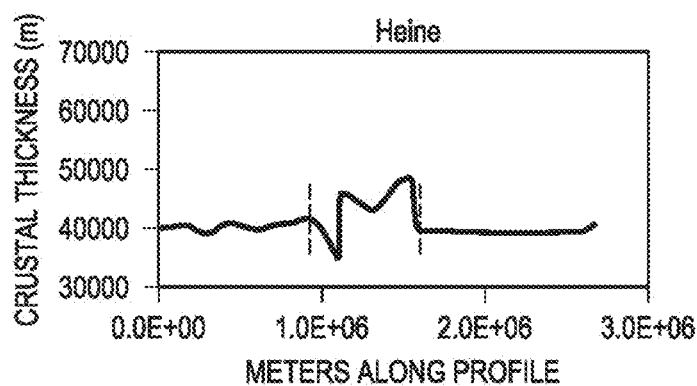
FIG. 3C6

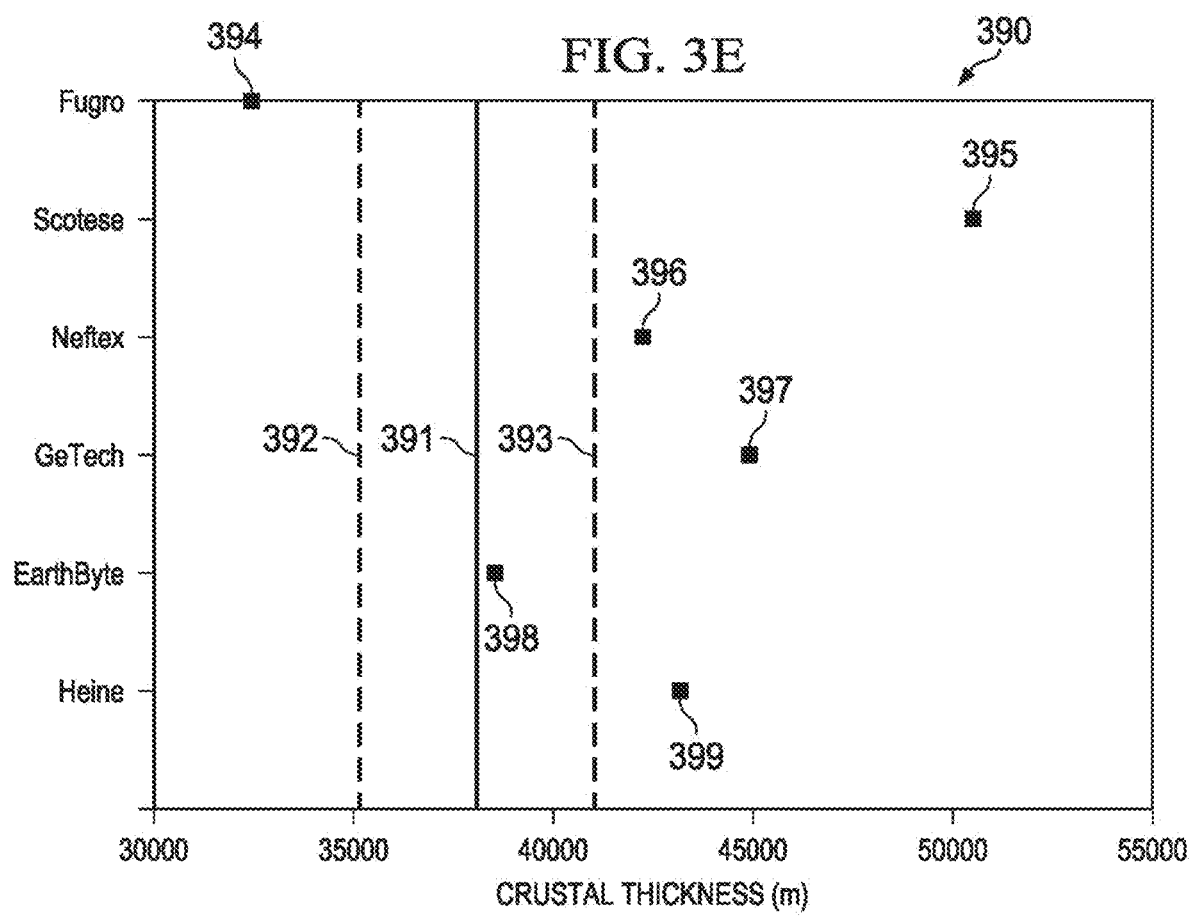

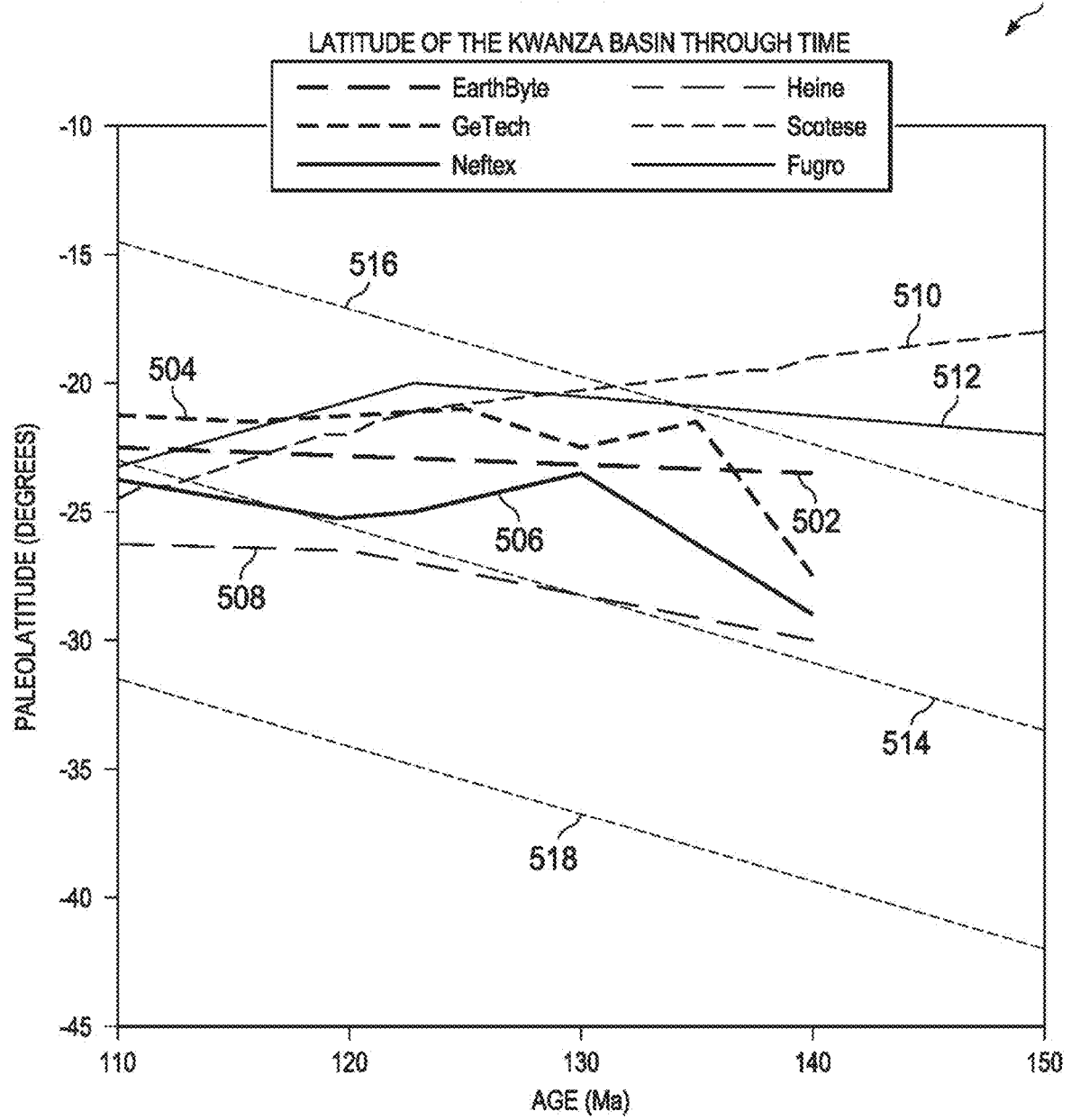

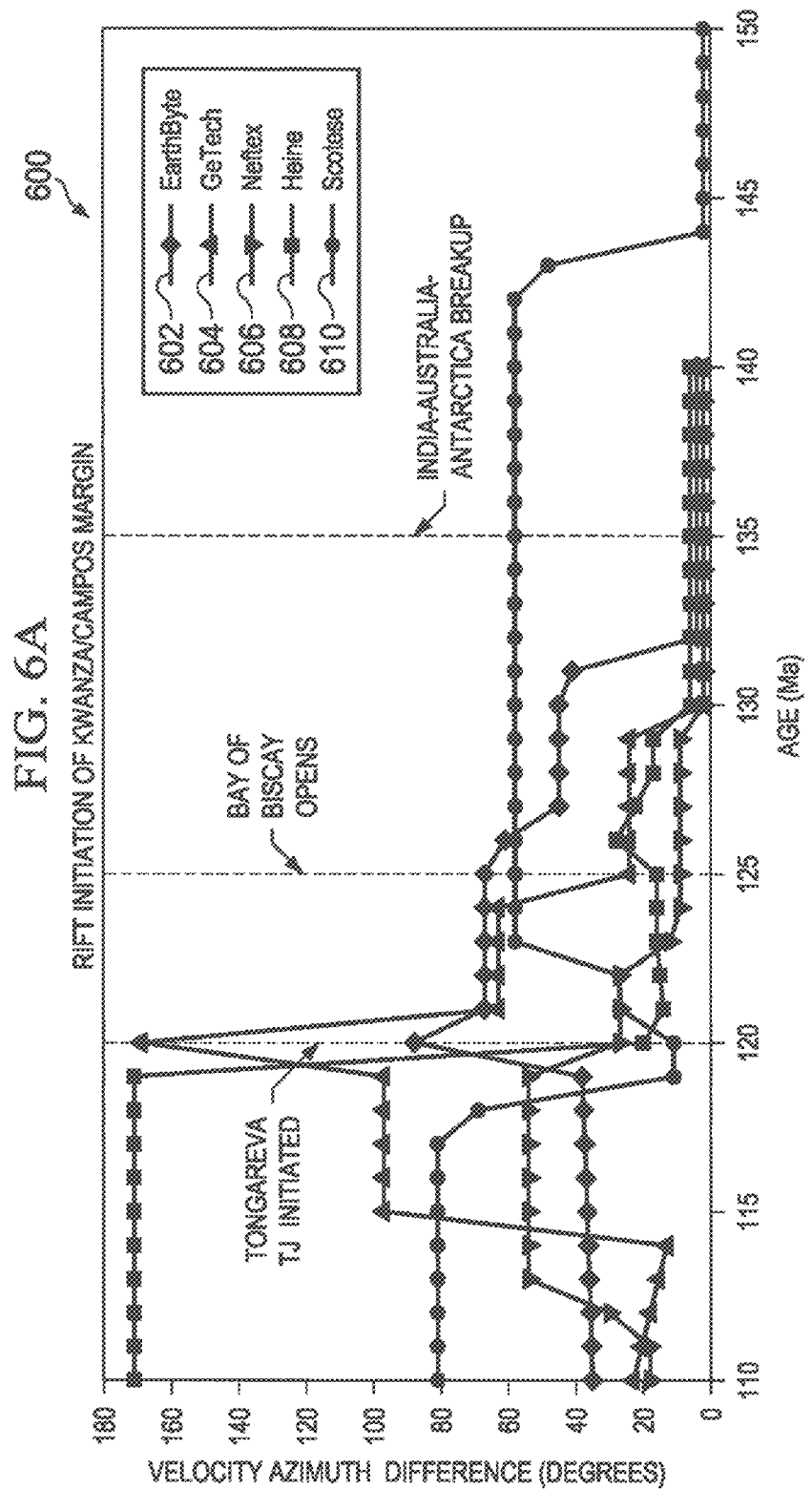

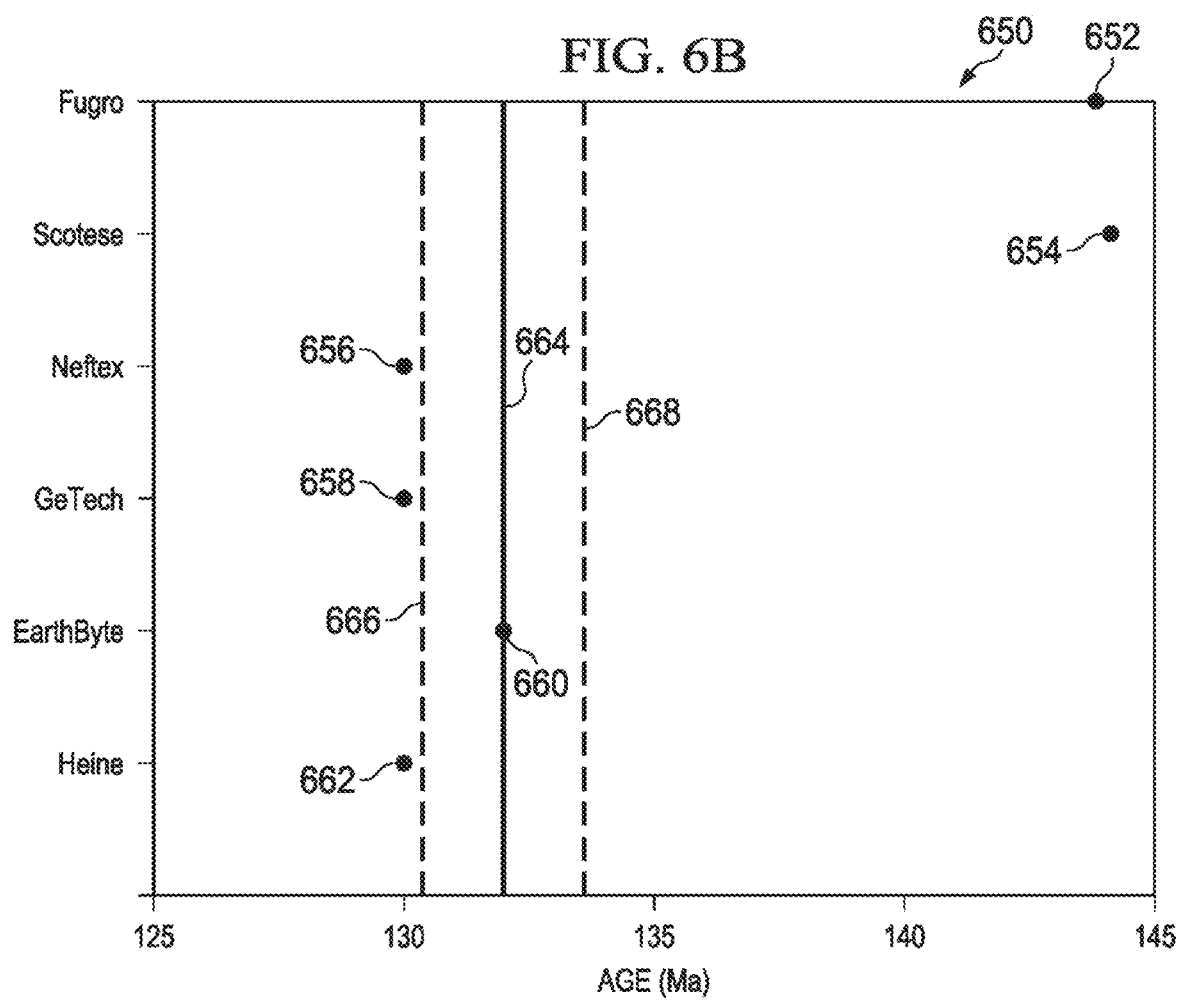

SCORE CARD 700

| MODEL | FLOWLINES | HOTSPOT | CRUSTAL THICKNESS | STRUCTURE | PALEO LATITUDE | RIFT INITIATION |
|---|---|---|---|---|---|---|
| FUGRO | 1 | 6 | 4 | 4 | 5 | 5 |
| SCOTESE | 5 | 4 | 6 | 2 | 6 | 5 |
| NEFTEX | 6 | 2 | 2 | 4 | 2 | 2 |
| GeTECH | 3 | 3 | 5 | 3 | 4 | 2 |
| EARTHBYTE | 2 | 5 | 1 | 1 | 3 | 1 |
| HEINE | 4 | 1 | 3 | 4 | 1 | 2 |

FIG. 7

QUANTITATIVE ASSESSMENT OF PLATE TECTONIC MODELS

RELATED APPLICATIONS

This patent application claims priority to U.S. application Ser. No. 14/632,677, filed Feb. 26, 2015, which in turn claims benefit of U.S. Provisional Application No. 62/103,608, filed Jan. 15, 2015, both entitled "Quantitative Assessment of Plate Tectonic Models". Both applications are herein incorporated by reference in their entireties.

BACKGROUND

Plate tectonics is a theory that attributes the past, present and future structures of the Earth's crust to the interactions of rigid lithospheric plates that move over the underlying mantle independently of each other. Reconstructing historical plate movements often provides valuable information to oil and gas companies assessing the formation properties of a particular geographic region (e.g., a hydrocarbon play). Such "paleogeographic reconstruction" provides data on the timing of the formation of basins due to tectonism, tectonic events responsible for the production of sediments and deformation, paleoclimates, and paleotopography, all of which may be used to assess exploration risk.

A number of paleogeographic reconstruction models are available and are widely used for the aforementioned purposes. The manner in which reconstruction models are selected to assess particular geographic regions, however, is suboptimal. In many cases, for example, reconstruction models are chosen for their ease of use or pleasing aesthetics. In other cases, models are chosen based on qualitative assessments of their potential usefulness in evaluating a specific region. These reconstruction model selection techniques focus on each model's superficial qualities instead of the model's quantitative accuracy.

SUMMARY

To address these issues, disclosed herein are techniques for the quantitative assessment of plate tectonic models. At least some of the embodiments described herein are directed to a method for quantitatively evaluating multiple computer-based plate tectonic models for application in a geographic region of interest, comprising: selecting a plurality of computer-based plate tectonic models; using said multiple computer-based plate tectonic models to generate one or more predictions for one or more geological parameters; obtaining observational data for each of said one or more geological parameters; for each of said one or more geological parameters, quantitatively comparing the predictions and the observational data to determine model rankings; and displaying said model rankings on a computer display. Such embodiments may be supplemented in a variety of ways, including by adding any of the following concepts or steps in any sequence and in any combination: further comprising determining an overall ranking of the models based on the model rankings and displaying the overall rankings on the computer display; wherein determining the overall ranking comprises determining averages of the model rankings; wherein determining the overall ranking comprises associating a different weight with each of the geological parameters; wherein quantitatively comparing the predictions and the observational data comprises using a least squares regression technique; wherein: the one or more geological parameters comprises fracture zones, the predictions include flow lines representing a particular fracture zone, the observational data includes a manually digitized representation of the particular fracture zone, and said quantitative comparison comprises comparing the flow lines to the manually digitized representation of the particular fracture zone; wherein said quantitative comparison comprises determining an error associated with each of the flow lines and using said errors to determine the model rankings; further comprising decimating the flow lines prior to said comparison based on either latitude data points used to form the flow lines, longitude data points used to form the flow lines, or a combination thereof; wherein: the one or more geological parameters comprises hot spots, the predictions include predicted hot spot tracks, the observational data includes an actual hot spot track, and said quantitative comparison comprises comparing the predicted and actual hot spot tracks; wherein: the one or more geological parameters comprises crustal thickness, the predictions include average crustal thicknesses of a pre-rift area calculated using simulated repositioning of a continental crust toward a rift, the observational data includes an average present-day thickness of the continental crust, and said quantitative comparison comprises comparing the average crustal thicknesses of the pre-rift area to the average present-day thickness of the continental crust; wherein: the one or more geological parameters comprises continental deformation, the predictions include predicted deformations on a continent, said predicted deformations identified by superimposing shapes upon a representation of the continent, the observational data includes an actual deformation on said continent, and said quantitative comparison comprises comparing the predicted and actual deformations; further comprising modeling a paleogeography of the representation of the continent after superimposing said shapes upon the representation of the continent; further comprising identifying a deformation in one or more of said shapes after modeling the paleogeography and comparing said deformation to observational intracratonal deformation data; wherein: the one or more geological parameters includes paleolatitudes, the predictions include predicted latitudinal movements of a geological feature, the observational data includes actual latitudinal movement of the geological feature obtained using paleomagnetic properties associated with said geological feature, and said quantitative comparison comprises comparing the predicted and actual latitudinal movements of the geological feature; wherein said geological feature comprises a plate and wherein said paleomagnetic properties are determined using a rock associated with said plate; wherein: the one or more geological parameters includes rift age, the predictions include predicted ages of a rift, the observational data includes actual age of the rift, and said quantitative comparison comprises comparing the predicted and actual ages of the rift; further comprising determining the predicted ages of the rift by calculating differences between velocity vectors of plates associated with said rift.

At least some embodiments are directed to a computer-readable storage medium comprising software code which, when executed by a processor, causes the processor to: generate predictions for a plurality of geological parameters, each of said predictions generated using a different plate tectonic model; determine quantitative data associated with said predictions; obtain quantitative observational data for each of said plurality of geological parameters; compare the quantitative data associated with said predictions to the quantitative observational data; use said comparisons to determine a plate tectonic model ranking for each of the plurality of geological parameters; average the plate tectonic model rankings across all of the plurality of geological parameters to identify an overall ranking of the plate tectonic models; identify a best fit plate tectonic model based on the overall ranking; and display the best fit plate tectonic model on a computer display. Such embodiments may be supplemented in a variety of ways, including by adding the following concept: wherein the processor performs said comparison using a least squares regression technique; and wherein the processor determines said plate tectonic model ranking for each of the plurality of geological parameters by applying weights to said plurality of geological parameters.

At least some embodiments are directed to a method for selecting one of a plurality of plate tectonic models to assess a geographic region, comprising: identifying a geographic region of the Earth; identifying a plurality of plate tectonic models that contain information pertaining to said geographic region; generating geological predictions for said geographic region based on the plurality of plate tectonic models; quantitatively comparing the geological predictions to observational data pertaining to said geographic region; ranking the plurality of plate tectonic models based on said comparisons; displaying the ranking on a display; receiving input selecting one of the plurality of plate tectonic models based on the ranking; and using the selected plate tectonic model to assess said geographic region of the Earth.

BRIEF DESCRIPTION OF DRAWINGS

In the drawings:

FIG. 3A is a schematic illustrating the manner in which a paleogeographic reconstruction may be performed.

FIGS. 3C1-3C6 are graphs depicting predicted crustal thicknesses in the pre-rift area after the paleogeographic reconstruction of FIG. 3B is performed.

FIG. 3D is a graph illustrating the manner in which the graphs in FIGS. 3C1-3C6 are to be interpreted.

FIG. 3E is a graph comparing the various tectonic models' predicted pre-rift crustal thicknesses.

FIG. 5 is a graph depicting predicted paleolatitudes of a geological feature over a finite period of time.

FIG. 6A is a graph comparing velocity azimuth differences against time for the various tectonic models.

FIG. 6B is a graph comparing the various tectonic models' predicted rift initiation dates.

FIG. 7 shows a scorecard usable to rank the plate tectonic models being evaluated.

DETAILED DESCRIPTION

Figure 1A:
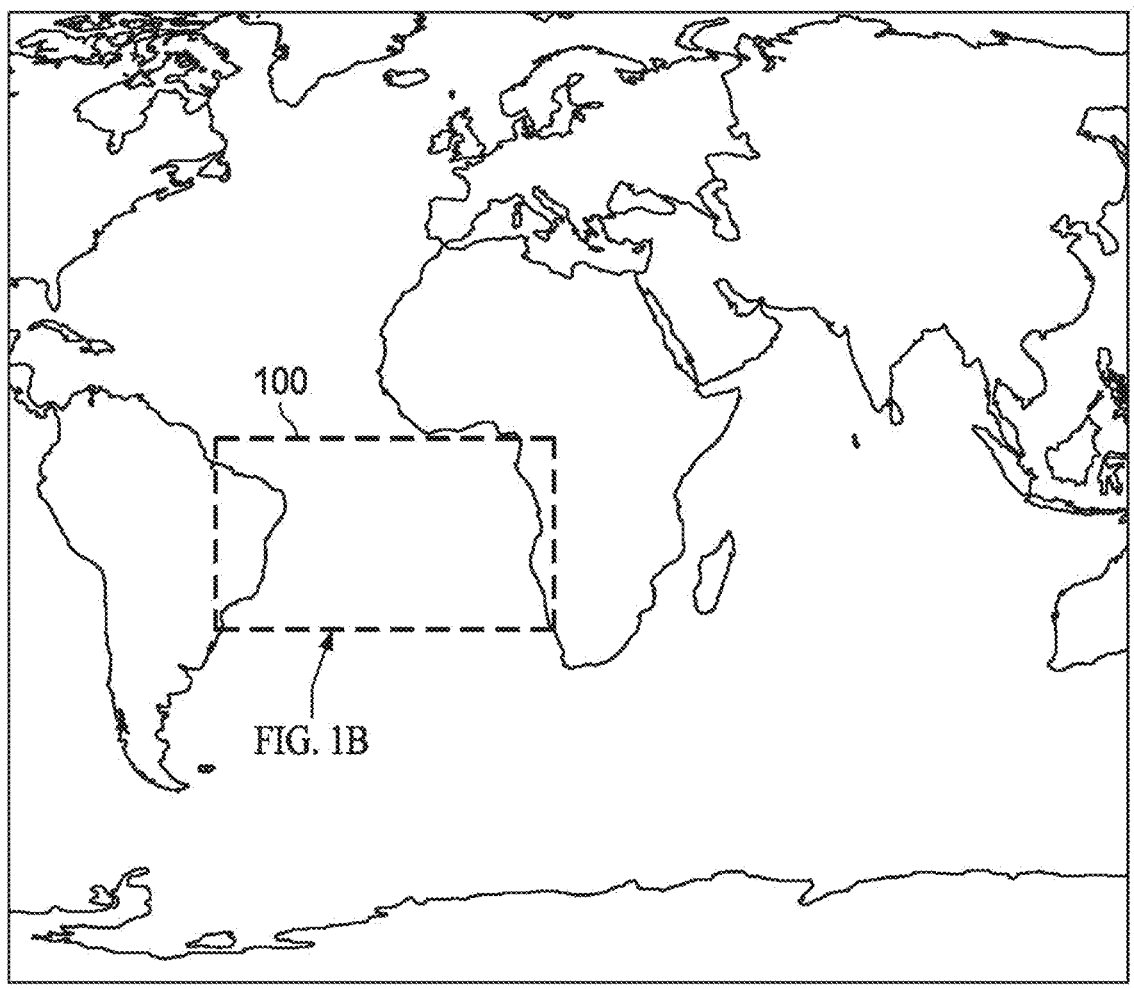
FIGS. 1A-1C are geological schematics depicting fracture zones and model-simulated flow lines between South America and Africa.

A plate tectonic model is generated by aggregating a substantial amount of geological data to formulate a theory describing the movement of the Earth's tectonic plates over hundreds of millions of years. Various plate tectonic models are available, and each model uses different data in different ways to support its theory on plate kinematics. For example, one model might place the rifting of a pair of continents at 100 million years ago, while a different model places the same rifting of continents at 120 million years ago. One model may posit that a given continent—for instance, Australia—followed a certain path after the breakup of Gondwanaland, while a second model dictates that Australia followed a slightly different path. The common thread through all such models is that each one contains a comprehensive theory on the movements of the plates over the course of Earth's history.

Disclosed herein are techniques for quantitatively assessing the suitability of such plate tectonic models for application in a particular geographic region (e.g., a specific hydrocarbon play). The techniques entail assessing and scoring each of a set of kinematic models (also referred to as "candidate models") by determining the accuracy with which that model predicts a variety of geological parameters that result from plate tectonics. The underlying assumption is that the model that most accurately predicts the selected geological parameters does so because it uses the most accurate tectonic history of the geographic region in question. Determining the most accurate model helps to reduce risk in hydrocarbon exploration by providing the best understanding of potential source, reservoir, and seal rocks, hydrocarbon maturation and migration, and potential hydrocarbon traps. In addition, an accurate model aids in the understanding of strain rate and paleo-geography, both of which are used to estimate historical and present stress states in the rock. The stress states may allow prediction of well-bore stability.

The assessed geological parameters may include, without limitation: fracture zones; hot spot tracks; crustal thickness; intracratonal deformation; paleolatitude; and rift initiation. Each model that is a candidate for application in a given region is evaluated by using that model to generate quantitative predictions relating to each of the aforementioned geological parameters (and, possibly, other parameters) in that region. Observed, quantitative data pertaining to those geological parameters—for example, obtained through the literature, databases, and any of a variety of other sources— is then compared against the parametric predictions generated by the models. Any suitable, quantitative comparison technique, such as a least squares regression, may be used. For each geological parameter evaluated, the models are ranked based on the extent to which their predictions deviate from the observed quantitative data for that geological parameter. The model with the highest overall ranking across all parameters is selected as the best model for application in the geographic region in question. In some embodiments, the overall model rankings are determined by calculating an average ranking for each model across all geological parameters assessed. In some embodiments, the overall model rankings are determined by assigning weights to each of the geological parameters assessed and then calculating a weighted average for each model. Variations on the technique by which overall model rankings are calculated are contemplated and included within the scope of the disclosure. Evaluation of each of the aforementioned geological parameters is now described in turn.

Fracture Zones and Flow Lines

A mid-ocean ridge is an underwater mountain system formed by mantle upwelling in response to seafloor plate spreading. A mid-ocean ridge may intersect with a transform fault, which, when active, may cause adjacent lithospheric plates on either side of the transform fault to move in opposite directions, resulting in a linear feature known as a fracture zone. Because the adjacent crust segments are of slightly different ages (and, therefore, different temperatures and degrees of subsidence), a fracture zone is maintained well beyond the mid-ocean ridge. The fracture zone serves as a highly reliable indicator of the movement of the tectonic plates relative to each other through time. Thus, models that model fracture zones most accurately in a particular region are likely the models with the most accurate plate tectonic data. The fracture zone geological parameter may be assessed by manually digitizing a fracture zone in the region of interest (e.g., in the Great Australian Bight) using commercially available software such as GPLATES®. Models are used to generate flow lines that attempt to predict the location and path of the fracture zone. Files containing the lines may be exported to a commercially available analysis software package, such as MICROSOFT EXCEL® or MATLAB®. The analysis software uses the lines in the form of geographic coordinates to perform a comparison (e.g., a least squares regression) between the flow lines (fracture zone predictions) generated by the models and the digitized fracture zone. The various models are ranked based on their accuracy. Although the various embodiments are described in the context of six models (i.e., FUGRO®, GETECH®, EARTHBYTE® HEINE®, NEFTEX® and SCOTESE®), the disclosed techniques may be used to assess any suitable plate tectonic model for any given pair of rifting continents.

Figure 1B:
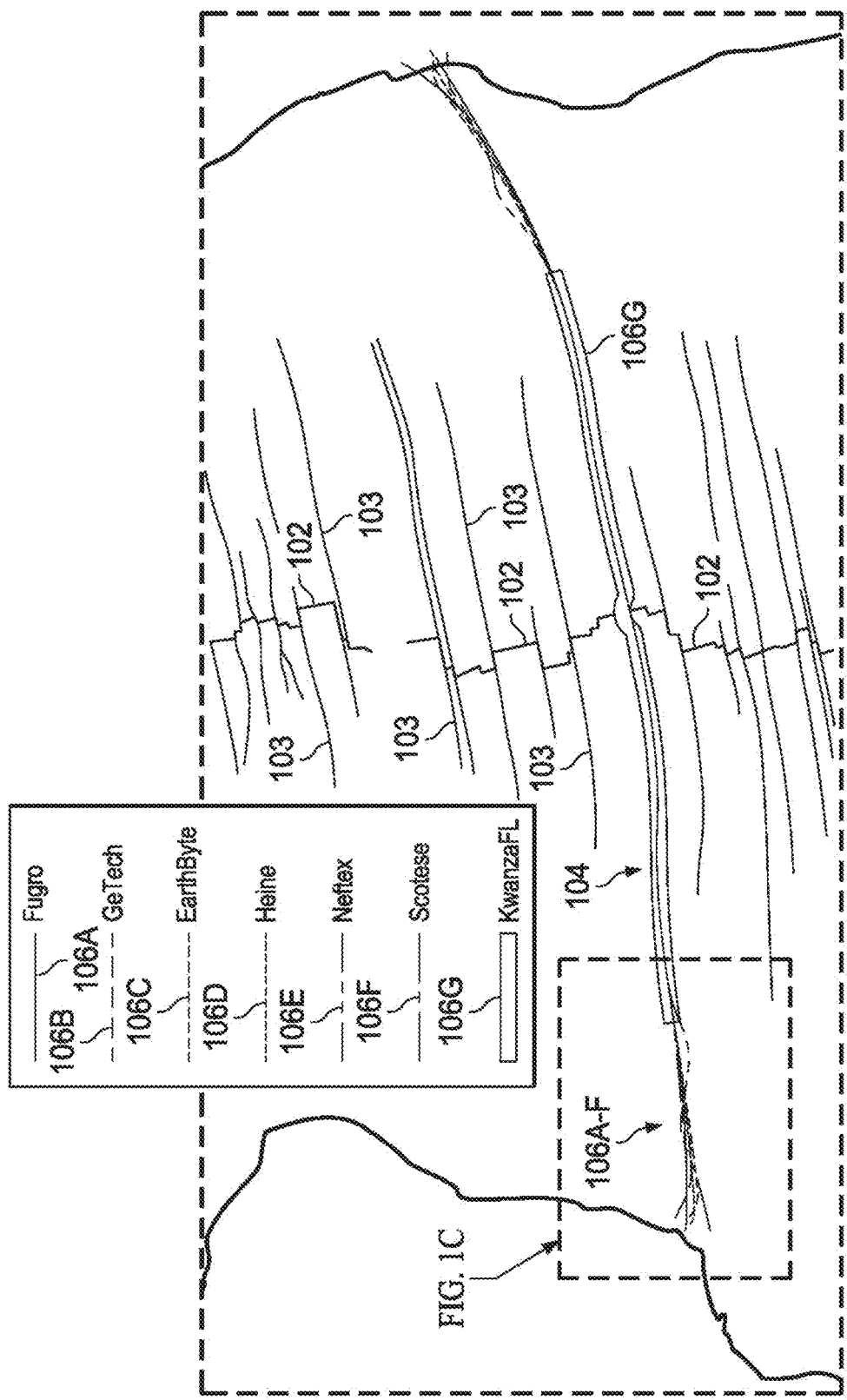
Figure 1C:
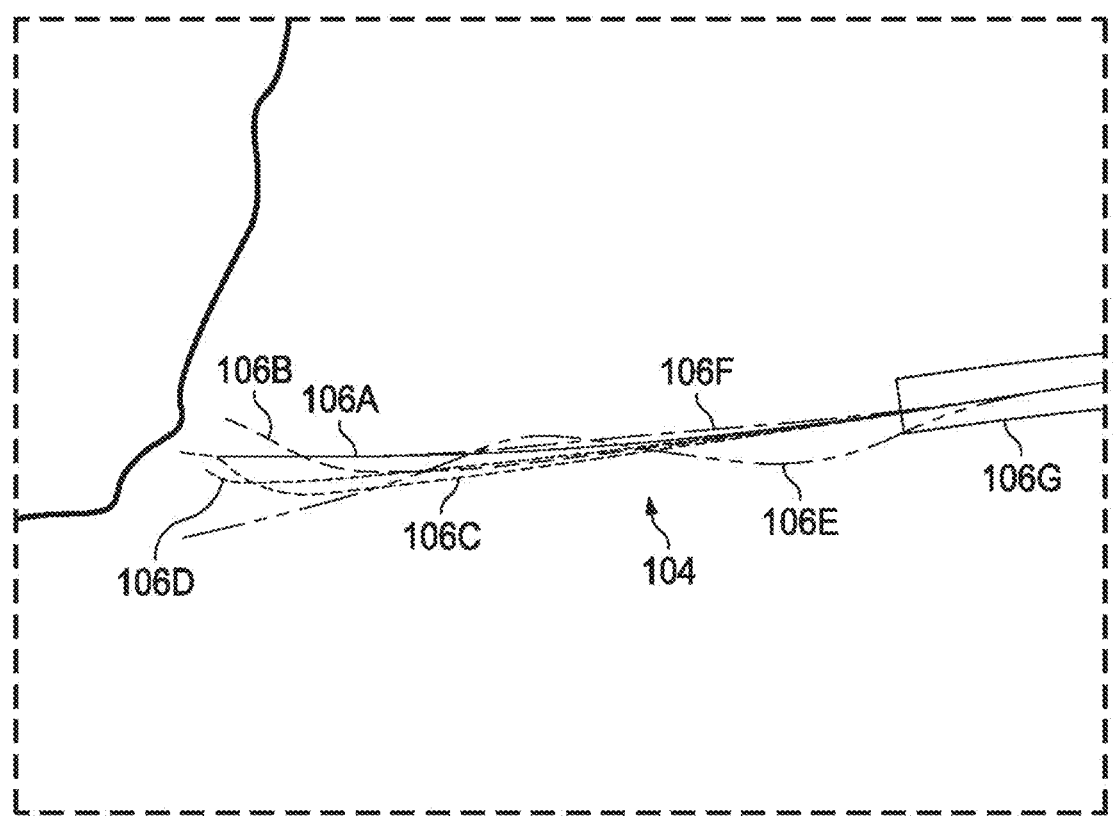

FIG. 1A is a world map with a box 100 that specifies the geographic area described in FIGS. 1B and 1C—that is, the South Atlantic Ocean between the Campos Basin near South America and the Kwanza Basin near Africa. FIG. 1B provides a more detailed view of the area encapsulated within the box 100. Specifically, a ridge 102 runs roughly north-south in the ocean basin, and numerous fracture zones 103 that run roughly east-west intersect with the ridge 102. The fracture zones 103 mark the locations at which the various portions of the ridge 102 offset from each other.

For purposes of this discussion, the geographical area specified by box 100 is the region in which the most superior of the tectonic models is to be applied. The models are used to generate multiple flow lines, each of which tracks the rotation of a rigid body (i.e., the continental plate) on a sphere (i.e., the Earth). Theoretically, fracture zones are a real-world manifestation of the rotation of plates on the surface of the Earth and, therefore, the modeled flow lines and observed fracture zones should match. The target fracture zone for a given comparison (in this case, target fracture zone 104) is selected by identifying the fracture zone closest to the geographic area of interest. Fracture zones can be identified from different publicly and commercially available datasets, such as, but not limited to, a global gravity anomaly grid. The model that generates the flow line most closely tracking the actual target fracture zone 104 is ranked as the most superior model for the fracture zone geological parameter. Conversely, the model that generates the flow line least closely tracking the selected fracture zone 104 is ranked as the most inferior model for the fracture zone geological parameter. Accordingly, FIG. 1B includes a plurality of flow lines 106A-106F, each of which is generated using a different tectonic model. Specifically, the flow lines 106A-106F are generated by the FUGRO®, GETECH®, EARTHBYTE®, HEINE®, NEFTEX® and SCOTESE® models, respectively.

Line 106G, which corresponds to "KwanzaFL," is the manually digitized fracture zone, derived from gravity anomalies, to which the competing model predictions are compared. The target fracture zone is manually digitized by visually locating the portion of the target fracture zone closest to a continental margin, selecting the "digitize new polyline geometry" feature in GPLATES® (or an equivalent feature in a similar software package), and clicking the cursor along the length of the target fracture zone. This action produces a digitized fracture zone.

FIG. 1C is a more detailed view of the flow lines 106A-106G. As FIG. 1C shows, the model-generated flow lines 106A-106G overlap in some areas and do not overlap in others. Thus, the flow lines are not identical, and some of the flow lines more accurately model the fracture zone 104 than others. To identify the degree of error associated with each flow line, a suitable software package—such as GPLATES®—may be used to generate and export the location of the flow lines from the competing models as points in a coordinate system (e.g., geographic or Universal Transverse Mercator (UTM)). This is also done for the manually digitized flow line 106G. The flow line seed point for each model run should be uniformly located at the intersection of the spreading center and the fracture zone closest to the hydrocarbon play of interest. The begin time should be set to a time prior to rifting. The flow lines and digitized fracture zone may then be imported to an analysis software package (e.g., MICROSOFT EXCEL® or MATLAB®) to perform a comparison (e.g., least squares regression) between the digitized fracture zone and each flow line generated by the different models.

Ideally, the flow line-to-fracture zone comparison should be done in as objective a manner as possible. For example, for flow lines and fracture zones running in a primarily east-west direction, the data points forming the flow lines and fracture zones are likely to vary primarily in terms of latitude and not longitude. Accordingly, each flow line's set of data points should be compared against the data points for the corresponding digitized fracture zone to identify the longitudes that the flow line and fracture zone have in common. The remaining data points for which there is no common longitude among the flow line and fracture zone should be decimated. Thus, what remains is a flow line and a digitized fracture zone that include only common longitudes. This isolates the latitude variable, thereby enabling the comparison of only latitudes at common longitudes. A similar technique may be applied for flow lines and fracture zones that run in a primarily north-south direction, which likely vary primarily in terms of longitude and not latitude. For northeast- or northwest-trending fracture zones, either of the coordinate variables (i.e., longitude or latitude, X or Y) may be used as the basis for assessing the discrepancy (e.g., squared residual) between a model-generated flow line and digitized fracture zone.

After comparing each flow line to the digitized fracture zone and determining an error associated with each flow line (e.g., squared residual), the flow lines may be ranked according to error. The flow line that most closely matches the digitized fracture zone (i.e., the flow line with the least error) is ranked first, and the flow line that least closely matches the digitized fracture zone (i.e., the flow line with the greatest error) is ranked last.

Hot Spot Tracking

Areas of magmatism where magma rises through the Earth's crust and that are not associated with volcanic arcs are called "hot spots." Certain types of hot spots are associated with magma pipes that originate at the boundary between the mantle and outer core of the Earth and leave tracks in the Earth's crust as the Earth's lithosphere moves relative to the mantle (e.g., the Hawaiian Islands). The spatial positions of these tracks are readily visible, and the time at which they were made can be determined using volcanic rocks associated with the tracks. Taken together, this information provides spatio-temporal data about the position of the tectonic plate associated with the tracks. Accordingly, the models may be used to generate hot spot tracks and these hot spot tracks may be compared to available observational data. The models that generate hot spot tracks that most closely match the observational data are ranked more highly than the models that do not.

Figure 2A:
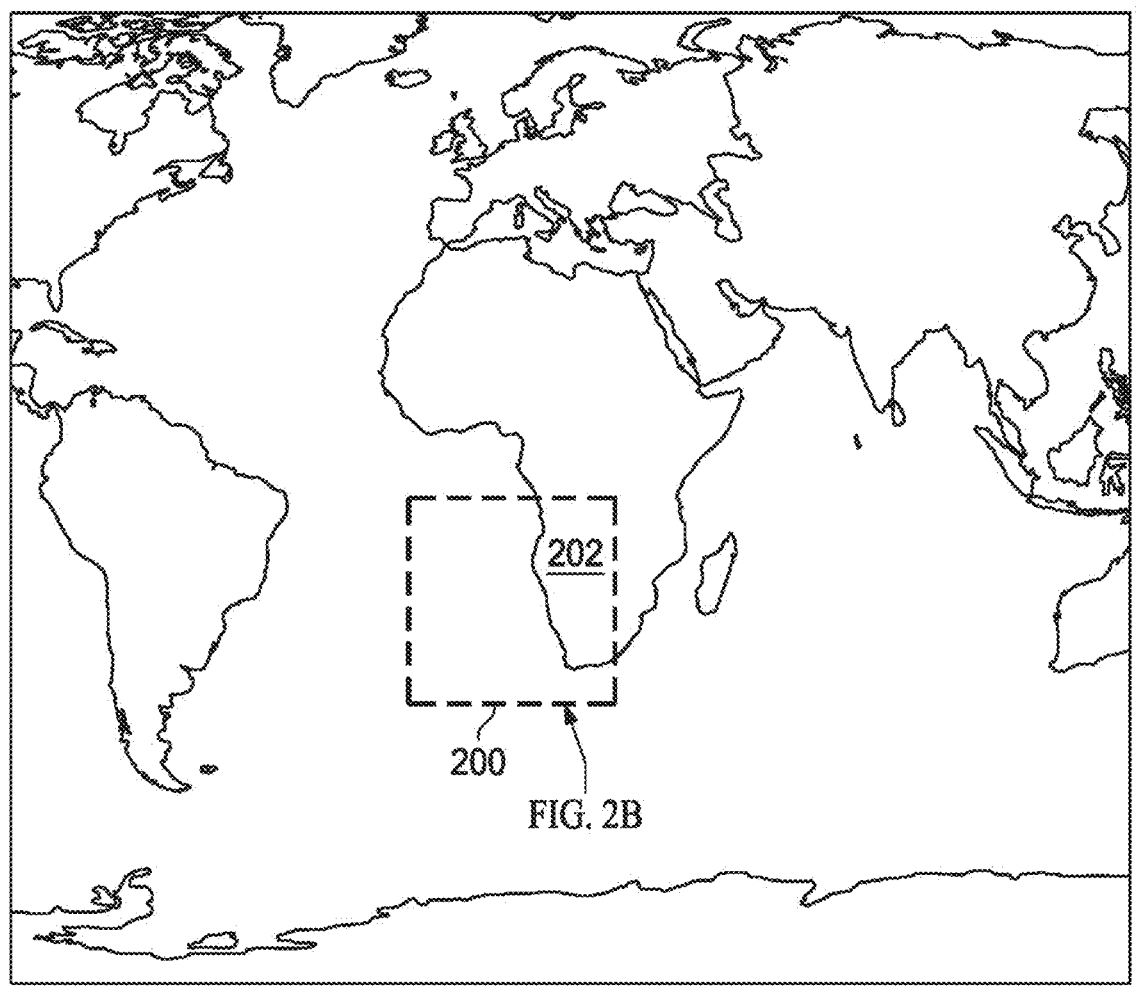
FIGS. 2A-2B are geological schematics depicting actual and simulated hot spot tracks in the South Atlantic Ocean off of the Angolan coast.
Figure 2B:
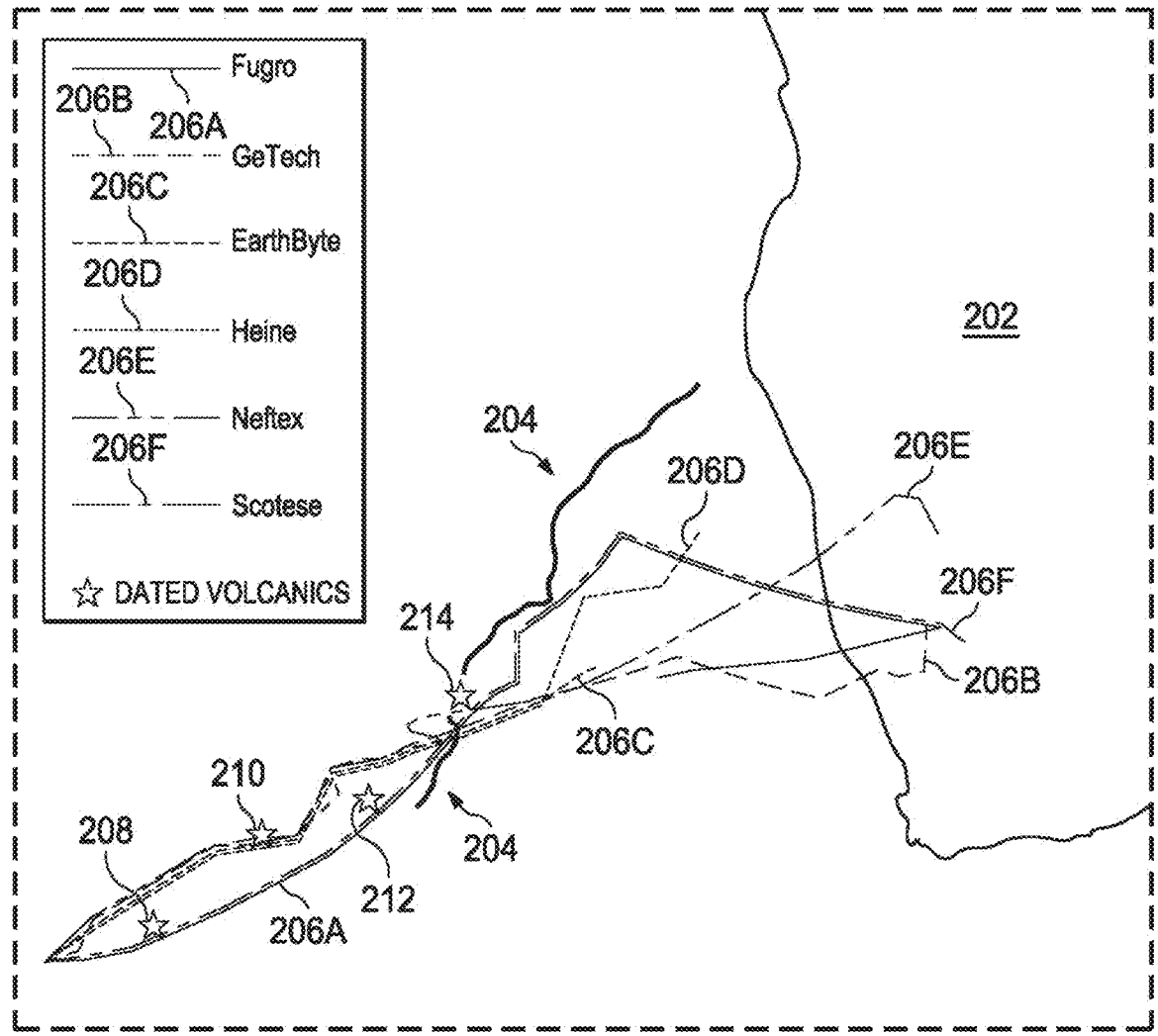

FIG. 2A is a world map with a box 200 that specifies the geographic area described in FIG. 2B—that is, the southwestern coast of Africa (numeral 202). FIG. 2B provides a more detailed view of the area encapsulated within the box 200. Specifically, FIG. 2B depicts an actual hot spot track 204 near the southwestern coast of Africa 202. The hot spot track 204 includes numerous volcanic hot spots that are situated in a somewhat linear fashion in a southwestern-northeastern direction near the present-day Namibian coast.

FIG. 2B also depicts multiple simulated hot spot tracks 206A-206F. The simulated hot spot tracks 206A-206F are generated using the FUGRO®, GETECH®, EARTHBYTE®, NEFTEX®, SCOTESE® and HEINE® tectonic models, respectively. The GPLATES® software package or a similar package may be used to model the hot spot tracks 206A-206F using the aforementioned tectonic models. To model the hot spot using a particular tectonic model, the GPLATES® "digitize new multi-point geometry" feature (or a similar feature in another software package) should be selected and a point made at the modern day location of the hot spot. The "motion path" feature is then used to generate the modeled hot spot track, with the "begin time" set to the age of the oldest volcanic in the hot spot track 204 to ensure that the entire set of volcanics in the track is modeled. Time intervals may be set to any appropriate number, and, in at least some embodiments, the time interval is set to one million years.

After each hot spot track is modeled using a different tectonic model, the simulated hot spot track is compared to the actual hot spot track 204 to identify the error associated with the simulated hot spot track. The comparison may be performed in at least two ways. In some embodiments, the simulated and actual hot spot tracks may be compared geographically to determine the degree to which the simulated hot spot track differs from the actual hot spot track. In some such embodiments, the simulated hot spot track may be decimated as described above with respect to the fracture zone geological parameter to ensure an objective comparison.

In other embodiments, the simulated and actual hot spot tracks are compared both geographically and temporally. Specifically, in such embodiments, the ages of selected volcanics in the actual hot spot track 204 are identified. Locations in the simulated hot spot track that correspond to the ages of the selected volcanics are identified. These locations in the simulated hot spot track are compared to the corresponding volcanics in the actual hot spot track 204 and a difference in location between the two is determined. This difference reflects the error associated with the simulated hot spot track. The error for the simulated hot spot track is determined for each age and the resulting errors are aggregated using any suitable technique (e.g., averaging). For example, as shown in FIG. 2B, the actual hot spot track 204 includes selected volcanics 208, 210, 212 and 214. (These volcanics may be selected as desired, although in at least some embodiments, no two selected volcanics will be concentrated in a single area.) The ages of the volcanics 208, 210, 212 and 214 may be identified as 29, 39, 64 and 72 million years, respectively. A model is then run to 72 million years ago. The point on the simulated hot spot track corresponding to 72 million years ago is then compared to the location of the volcanic 214 and an error is determined. The model is then run to 64 million years ago, and the point on the simulated hot spot track corresponding to that age is compared to the location of the volcanic 212 to determine an error. The same error determination process is repeated for volcanics 210 and 208 and the resulting four errors are averaged or otherwise aggregated to produce a final error value associated with the simulated hot spot track. The technique is performed for each of the tectonic models to produce an error value associated with each of the models. Regardless of the technique used to determine the error associated with each tectonic model, the errors are used to rank the tectonic models for the hot spot track geological parameter.

Crustal Thickness

Extension of the continental lithosphere results in the presence of a thin, extended crust between the continent and ocean basin. Tectonic models should be able to reconstruct this extension by re-positioning the continental crust toward its pre-extension position, which, in turn, is accomplished by overlapping the continental crust with the extended crust. The degree of overlap should be just enough so that the plates involved in the extension are in their original, pre-extension positions, and the average crustal thickness of the pre-rift zone is within the range of expected crustal thicknesses of the modern, un-stretched continental crust. The degree to which a model properly does this indicates whether the model accurately represents the extension process. Whether the re-positioning is properly done may be determined by calculating the average crustal thickness across the pre-rift area. If the degree of overlap is just enough so that the plate is in its original position, the average crust thickness across the area of overlap will be the same as the average crust thickness on the remainder of the continental crust. This is because the amount of extended crust that overlaps with continental crust is the same amount of crust that was present pre-rift. Stated another way, if a particular model is poor and results in an excessive degree of overlap, the average thickness in the pre-rift area will be substantially greater than the average thickness on the rest of the continental crust. This is because the closer the conjugate continents are forced together, the greater the relative contributions of extended and un-extended crust to pre-rift thickness. As a result, the width of the rift zone decreases, and the average thickness per unit width may be undesirably driven over the normal crustal average by a suboptimal model. The best model optimizes this length-thickness parameter.

A poor model may result in an insufficient degree of overlap, causing the average thickness in the pre-rift area to be substantially less than the average thickness on the rest of the continental crust because an insufficient amount of extended continental crust contributes to the thickness of the pre-rift zone for the calculated width of that zone. A good model will adjoin the conjugate continents just enough so that the average thickness in the pre-rift area is the same as the average thickness on the rest of the continental crust, within an acceptable margin of error (i.e., in this case, plus or minus 1 sigma, which is the Gaussian variance of continental crustal thickness determined from gravity and seismic study of the continents). The models may be ranked by comparing the errors each model has between average thickness over the pre-rift area and the average thickness over the remainder of the continental crust.

FIG. 3A is a schematic illustrating the manner in which a tectonic reconstruction of the Earth's crust may be performed. Specifically, FIG. 3A is a cross-sectional view of the Earth's crust, which includes a continental crust 300, an extended crust 302, and an oceanic crust 304 for one continent in a conjugate pair of continents, and which further includes the extended crust 306 and another continental crust 308 for the second continent in the conjugate pair of continents. Ocean water 310 rests above the oceanic crust 304 and portions of the extended crusts 302 and 306, as shown. To perform the reconstruction described above, computer software—such as GPLATES® or similar software—is used to relocate at least parts of the conjugate continental crusts 300, 308 and the extended crusts 302, 306 toward the center of the oceanic crust 304. This is done along a rotation path in iterative time steps (typically 1 million years). At each time step, a portion of the oceanic crust 304 is removed. This portion has a width that is equivalent or roughly equivalent to the distance the conjugate continental crusts are moved toward each other. This simulates mid-ocean ridge spreading in reverse and is conceptually similar to the descent of the oceanic crust back into the mantle at the spreading ridge from which it originated.

The arrows 310, 312 indicate two end member cases of re-locating the continents back into their pre-rift positions. The arrows 312 begin at the boundaries between extended and oceanic crust for each continent (indicated by a vertical line). If the model were to bring these two boundaries together, the basin would be under-closed, with the average crustal thickness being substantially less than the average thickness of the rest of the continent as shown by numeral 376 in FIG. 3D. Stated another way, a large valley would still remain between the continental crusts. However, if the model were to bring the boundaries between the continental and extended crusts of each conjugate pair together (as arrows 310 indicate in FIG. 3A), the extended crust would fully overlap with the continental crust of the reconstructed continent, and the average crustal thickness of the pre-rift zone would be substantially greater than the average thickness of the continental crust (as numeral 378 indicates in FIG. 3D). A superior model will produce a profile of crustal thickness as indicated by numeral 380 (FIG. 3D), where the average crustal thickness of the pre-rift zone approximates the average of the un-deformed portions of the adjoined continents.

Figure 3B:
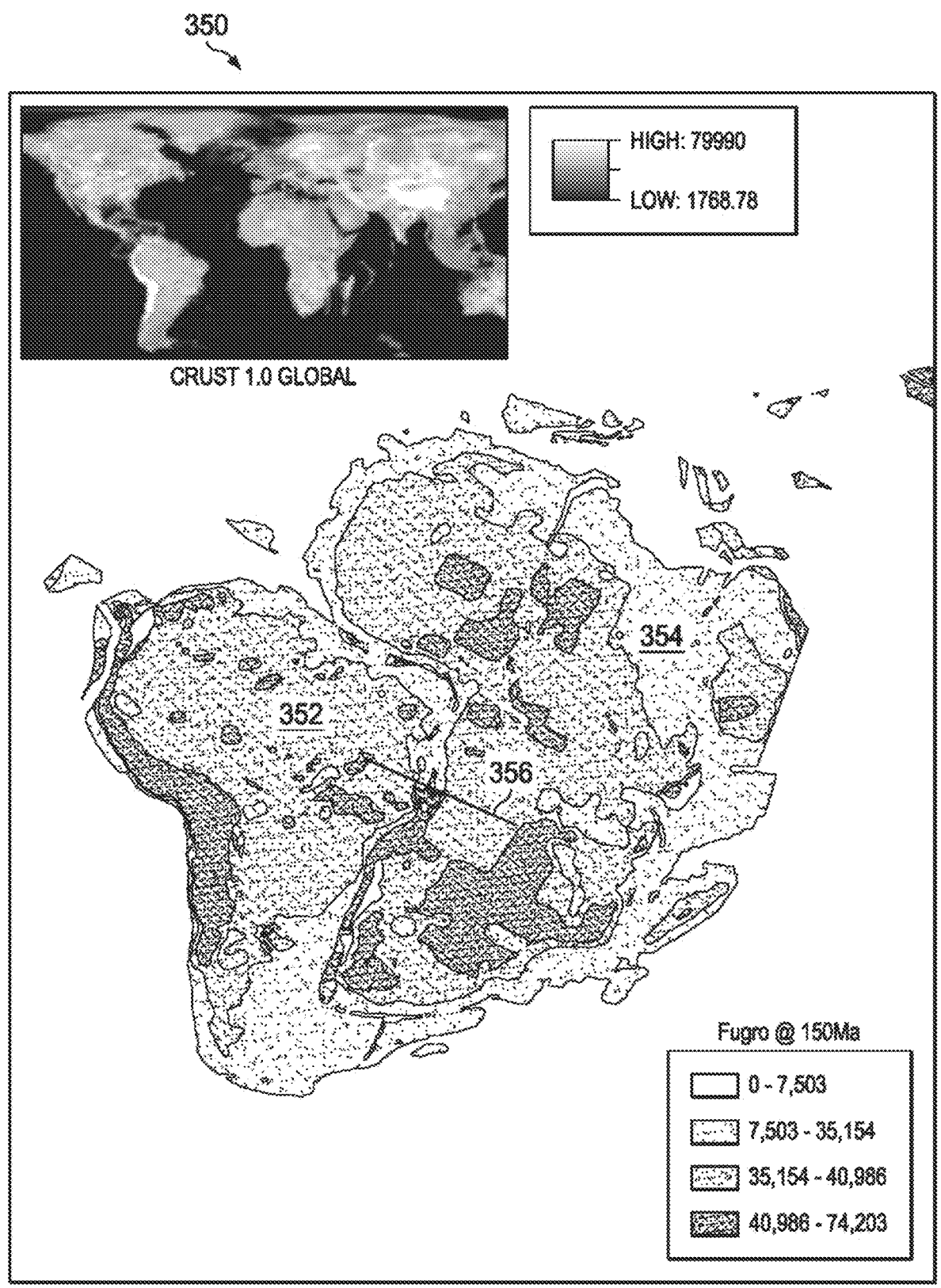
FIG. 3B is a geological schematic of a paleogeographic reconstruction of South America and Africa used to determine average crustal thickness in the pre-rift area.

FIG. 3B is a geological schematic of a paleogeographic reconstruction 350 of South America and Africa used to determine average crustal thickness at the pre-rift area. As shown, South America (numeral 352) and Africa (numeral 354) have been brought together to their original, pre-rift positions using the FUGRO® tectonic model. Line 356 indicates a profile extending from the interior of one continent, through a pre-rift zone where the continents come together in the reconstruction 350, and into the interior of the other continent. The precise location of the pre-rift zone 356 is the portion of the line whose ends are fixed to the modern-day rift shoulder of each continent, indicated by the arrows in FIG. 3C1. These are quantitatively selected as the first point in the profile for each continent with a value for the average crustal thickness of that continent, as you move along the profile from the ocean basin to the continent interior. The GPLATES® software (or equivalent software) is used to determine the relative positions of the continents upon which rasters of the current crustal thickness are imposed. These rasters may be summed to determine the profile of crustal thickness in the pre-rift zone, from which the average crustal thickness of the pre-rift zone can be determined. Rasters may be summed using a geographical information system (e.g., ARC GIS® by ESRI®) and the averaging may be done using, e.g., MICROSOFT EXCEL® or MATLAB®.

As explained above, if the FUGRO® tectonic model reconstruction plausibly brings the African and South American plates together to their original, pre-rift positions, the average crustal thickness along the pre-rift zone 356 will be within a standard variance of the average crustal thickness of the adjoining continents (a value that may be determined from the literature or using a geographical information system to average the values of crustal thickness rasters for the adjoining continents). The FUGRO® tectonic model's reconstruction 350 produces a crustal thickness profile along the pre-rift zone 356 as shown in FIG. 3C1. The remaining candidate tectonic models may be used to perform a reconstruction similar to reconstruction 350, and crustal thickness profiles similar to that shown in FIG. 3C1 may be generated for each such tectonic model. FIGS. 3C2-3C6 show such crustal thickness profiles for the SCOTESE®, GETECH®, NEFTEX®, EARTHBYTE®, and HEINE® tectonic models, respectively. In each of these profiles, the x-axis represents location along the pre-rift zone 356 and the y-axis represents crustal thickness.

FIG. 3E is an illustrative graph 390 comparing the various tectonic models' predicted pre-rift crustal thicknesses. Specifically, line 391 represents the average crustal thickness across the continents being brought together and lines 392, 393 represent the 1 sigma variance for continental crustal thickness. The graph 390 also includes data points 394-399, which represent the average crustal thicknesses in the pre-rift zone for the FUGRO®, SCOTESE®, NEFTEX®, GETECH®, EARTHBYTE® and HEINE® tectonic models, respectively. These models may be ranked using the graph 390. Because the EARTHBYTE® average crustal thickness 398 comes closest to the line 391 in this example, it is ranked highest among the tectonic models, while the SCOTESE® model is ranked the lowest.

Intracratonal Deformation

The interiors of continents often experience deformation as a result of, e.g., failed rift zones or large strike-slip features. Examples of such deformations include the West and Central African Rifts on the African continent and the Parana Basin Fault and Salado Basin Deformation on the South American continent. Some plate tectonic models accurately account for these deformations, while others do so inaccurately or fail to account for the deformations at all. Still other models account for deformations that, in reality, may not exist.

Accordingly, the disclosed technique includes assessing the accuracy with which each model accounts for the large-scale deformations on a given continent. Specifically, the deformations accounted for by each model is compared to observational data (e.g., obtained from the literature) to determine how faithfully that model matches the observational data. Recognizing whether a particular model accounts for intracontinental deformations, however, may in some cases be difficult because the deformations may not be easily visualized. To this end, the modeling software being used (e.g., GPLATES®), in combination with a geographic information system package (e.g., ARC GIS®), may be used to superimpose geometric shapes—such as circles or ellipses—onto the continent of interest in that continent's modern-day state. That continent's paleogeography is then modeled to assess the kinds of intracratonal deformation for which that model accounts, if any. Instances of intracratonal deformation are easily recognized by identifying malformations in the geometric shapes—for instance, a portion of a circle may be missing or offset. Each shape malformation represents a deformation, and the constellation of deformations within a particular modeled continent may be compared to observational data from the literature to determine whether the model accounted for some or all known deformations and/or whether the model included deformations that do not exist. The accuracy with which each model accounts for the known deformations is used to rank the models.

Figure 4:
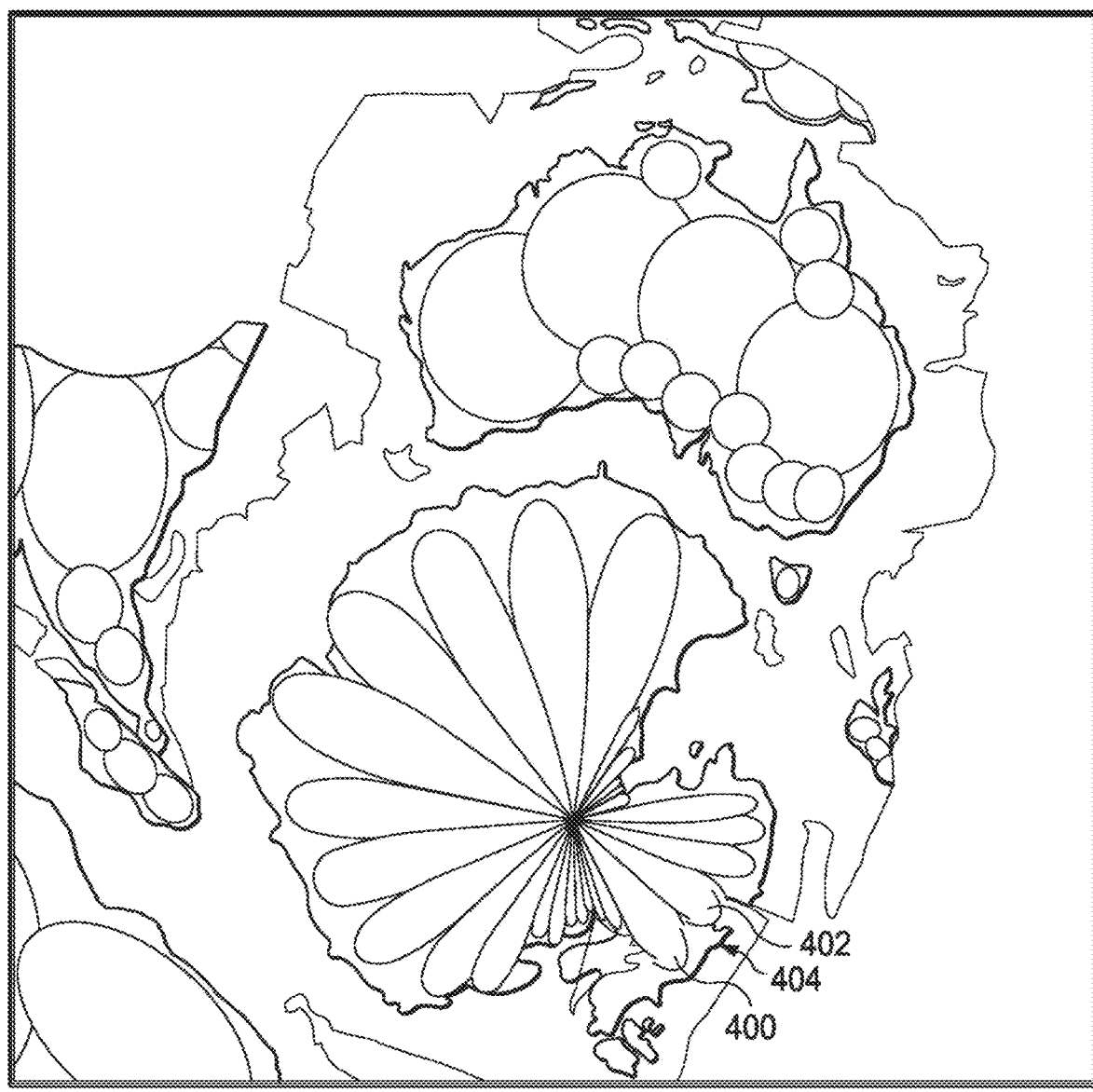
FIG. 4 is a geological schematic of a paleogeographic reconstruction of Antarctica, Australia, the Indian subcontinent and Africa on which symmetrical shapes are superimposed to identify intracratonal deformations.

FIG. 4 is a paleogeographic reconstruction of a subset of the continents produced by the breakup of the Gondwana supercontinent, including Antarctica, Australia, the Indian subcontinent and Africa. Symmetrical shapes have been superimposed on these continents as shown to facilitate the identification of intracratonal deformations. More specifically, these figures show the symmetrical shapes after they have been superimposed on the continents as they exist today and after the continents' paleogeography has been modeled to a prior time at which the Gondwana supercontinent was breaking apart. As a result of this paleogeographic reconstruction, one or more of the symmetrical shapes shown in FIG. 4 contains one or more irregularities. For example, shapes 400, 402—which, prior to the reconstruction, were symmetrical ellipses—now contain irregularities, denoted by arrow 404. These irregularities denote the presence of continental deformations that occurred during the time period over which the reconstruction was performed. The irregularities may be compared to continental deformations known in the literature to determine whether the tectonic model used to perform the reconstruction located all known deformations and whether the model contained additional irregularities that did not correspond to any known deformations. This comparison is used to ascribe an error value to the tectonic model, and the process is repeated for each of the candidate models so that an error value is determined for each model. The models are then ranked based on the error values. The error calculation technique may be modified as desired. For instance, it may be adapted to apply greater weight to deformations of greater importance and to apply lesser weight to deformations of lesser importance.

Although this geological parameter assessment technique is described in the context of the continents that break off of the Gondwana supercontinent, it—like any other technique described herein—may be applied to other continents as well. Application of this technique to South America and Africa, for instance, yielded the following highest-to-lowest model ranking: EARTHBYTE®, SCOTESE®, GETECH®, and a three-way tie between FUGRO®, NEFTEX® and HEINE®.

Paleolatitudes Derived from Paleomagnetic Data

When an igneous or sedimentary rock forms, the Earth's magnetic field affects the magnetic properties of the forming rock. Analyzing a rock provides information about the inclination and declination of the Earth's magnetic field at the location where the rock was formed. Once the inclination or declination of the Earth's field is determined from a particular rock, known mathematical equations may be used to determine a latitude corresponding to that inclination. Differences in the magnetic declination of the rock from declination of the field where the rock was obtained indicate a rotation about a vertical axis for that rock. In this way, the paleomagnetic properties of a rock may be used to determine the latitude at which that rock was likely formed, and how that body has rotated. That latitude of formation may be compared to the rock's present latitude to form conclusions about the path that the rock traveled and, by extension, conclusions about plate tectonic paths.

Accordingly, rocks from a specific area of interest (e.g., the Kwanza basin near Angola) may be analyzed to determine their paleomagnetic properties and these properties may be used to determine the changing paleolatitude of those rocks over time. Each of the models may then be used to model the shift in paleolatitude for the area of interest. The accuracy with which each model tracks the observational data is subsequently determined and used to rank the models.

FIG. 5 is a graph 500 depicting predicted paleolatitudes of an illustrative geological feature—more specifically, the Kwanza basin—over a finite period of time. The graph 500 includes curves 502, 504, 506, 508, 510 and 512, which correspond to the EARTHBYTE®, GETECH®, NEFTEX®, HEINE®, SCOTESE® and FUGRO® tectonic models, respectively. The x-axis corresponds to age in millions of years and the y-axis corresponds to paleolatitudes in degrees. The dashed line 514 represents the movement of the Kwanza basin as determined using paleomagnetic data obtained from the literature and from other sources such as, e.g., the International Association of Geomagnetism and Aeronomy (IAGA) Global Paleomagnetic Database. The dashed lines 516, 518 represent 95% confidence intervals. As the figure shows, curve 508, which corresponds to the HEINE® tectonic model, is closest to matching the line 514, while the SCOTESE® model, represented by curve 510, is the furthest from matching the line 514. Accordingly, the HEINE® model is ranked first and the SCOTESE® model is ranked last. The degree to which the models conform to the data can be determined by summing the squared residuals between the paleomagnetic model and the paleogeographic models.

Rift Initiation

Another geological parameter that may be used to rank a group of plate tectonic models is the age of a particular rift event. Specifically, the technique includes using the models to determine a projected age of a particular rift and comparing the projected age with an actual age accepted in the literature. Using GPLATES® or similar software, for instance, a model may be used to project the age of a particular rift by subtracting the velocity vectors (oriented in the directions of the plates' movements) of the two rifting plates from each other (preferably at a relatively small time step to increase precision of the identified rifting time). The first time step at which the difference between the vectors is greater than zero is the time at which rifting begins. For comparison purposes, the actual age of rifting may be determined in various ways. For instance, rifts that have associated magmatism may be dated using a radiometric system. The basal synrift sedimentary unit also provides a rifting age via calibrated biostratigraphy. Such rift information may be obtained from the literature. The difference between modeled rift ages and actual rift ages is then used to rank the models.

FIG. 6A is a graph 600 comparing velocity azimuth differences for the rift initiation of the Kwanza/Campos margin (i.e., the separation of South America and Africa) against time for the various tectonic models. Specifically, the graph 600 includes curves 602, 604, 606, 608 and 610, which correspond to tectonic models EARTHBYTE®, GETECH®, NEFTEX®, HEINE® and SCOTESE®, respectively. The SCOTESE® model, represented by curve 610, places the rift initiation of the Kwanza/Campos margin at approximately 144 million years ago; the EARTHBYTE® model, represented by curve 602, places the same rift initiation at approximately 132 million years ago; and the NEFTEX®, HEINE® and GETECH® models, represented by curves 606, 608 and 604, respectively, place the same rift initiation at approximately 130 million years ago.

FIG. 6B is a graph 650 comparing the various tectonic models' predicted rift initiation dates to the best estimate from the geological literature. The graph 650 includes data points 652, 654, 656, 658, 660 and 662, which correspond to the FUGRO®, SCOTESE®, NEFTEX®, GETECH®, EARTHBYTE® and HEINE® tectonic models, respectively. The graph 650 also includes a line 664, which represents the best estimate from the geological literature for the rift initiation at the Kwanza/Campos margin, and lines 666, 668, which represent the 95% confidence interval. As shown, the EARTHBYTE® model is the most accurate and is thus ranked first, while the SCOTESE® model is least accurate and is thus ranked last.

Ranking of Models

A quantitative analysis of the factors above allows for comprehensive comparison of a variety of tectonic plate models. Identification of the most accurate tectonic plate model allows for better evaluation of the exploration risk (i.e., uncertainty) of a frontier basin based on the improved documentation of heat flow history (from rifting time and duration) and paleo-environments of deposition for reservoir rock and source rock distributions (bracketing thermal subsidence, paleo-latitude history, and paleo-geography). An accurate tectonic plate model also provides documentation of strain rate and paleo-geography, allowing for estimation of historical and present stress states in the rock which can be used to understand well-bore stability if wells are drilled.

Accordingly, each model may be ranked based on its performance with respect to a single geological parameter as well as its overall performance across all geological parameters. FIG. 7 shows a scorecard 700 that ranks each of the candidate models based on its performance with respect to each of the geological parameters. Because the EARTHBYTE® model has the highest average ranking, it is ranked first overall. Thus, the EARTHBYTE® model is deemed to be the most quantitatively accurate tectonic model for use in assessing hydrocarbon plays in the Kwanza/Campos basin area between South America and Africa. Other techniques, however, also may be used to identify the most quantitatively accurate model. For example, the six geological parameters described above and included in the scorecard 700 may be weighted differently so that greater emphasis is placed on certain parameters and lesser emphasis is placed on other parameters. For instance, if all weight were placed on the flow lines parameter and no weight on any other parameter, the FUGRO® model would be designated as the most quantitatively accurate tectonic model under consideration. In such embodiments, the weight applied to each geological parameter will best be ascertained by one of ordinary skill in the art familiar with the hydrocarbon play, geological parameters and plate tectonic models being evaluated.

Figure 8:
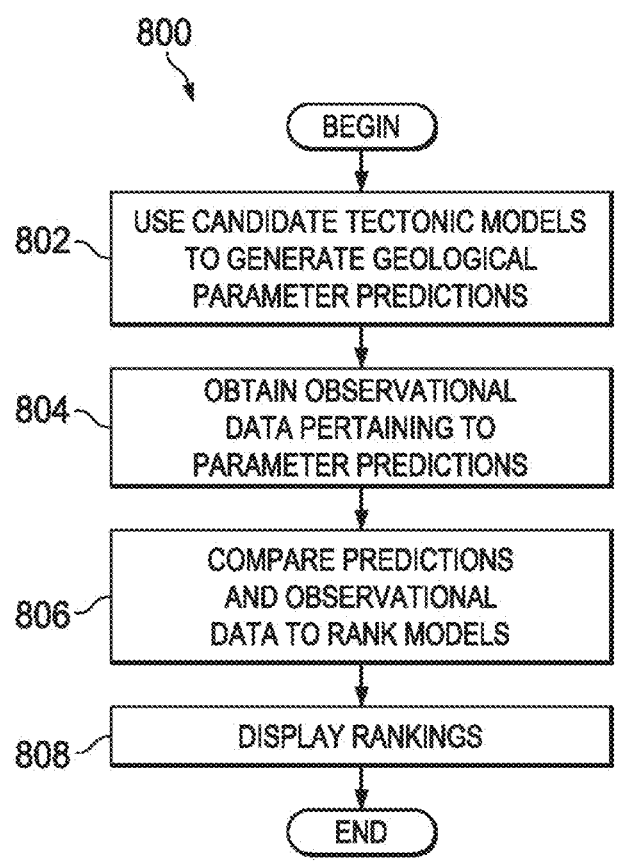
FIG. 8 is a flow diagram of a method usable to implement the techniques described herein.

FIG. 8 is a flow diagram of a method 800 usable to implement the techniques described herein. The method 800 begins by using the multiple computer-based plate tectonic models to generate predictions for one or more geological parameters (step 802). As explained above, illustrative geological parameters include fracture zones and flow lines, hot spot tracks, crustal thickness, intracratonal deformation, paleolatitudes, and rift initiation. Other parameters are contemplated and fall within the scope of the disclosure. The method 800 also includes obtaining observational data for each of the one or more geological parameters (step 804). The term "observational data" encompasses any data against which model-generated predictions or reconstructions may be compared to determine the error associated with the predictions or reconstructions. Such observational data may include data from the literature, data obtained using GPLATES® or a similar software package, or data from any other suitable source.

The method 800 further includes, for each of the one or more geological parameters, quantitatively comparing the predictions and the observational data to determine model rankings (step 806). Such a comparison may include, for instance, a least squares regression analysis, although the scope of disclosure is not limited as such. For example, with respect to the intracratonal deformation parameter, analysis of a model's performance may include counting the number of erroneous deformations that model produced and summing that number with the number of deformations that the model failed to identify. The method 800 also includes displaying the model rankings on a computer display (step 808). The displayed information may include the rankings on a per-geological-parameter basis, as shown in the scorecard 700 of FIG. 7. Alternatively or in addition, the overall rankings (weighted, non-weighted or both) across all assessed geological parameters may be displayed.

Figure 9A:
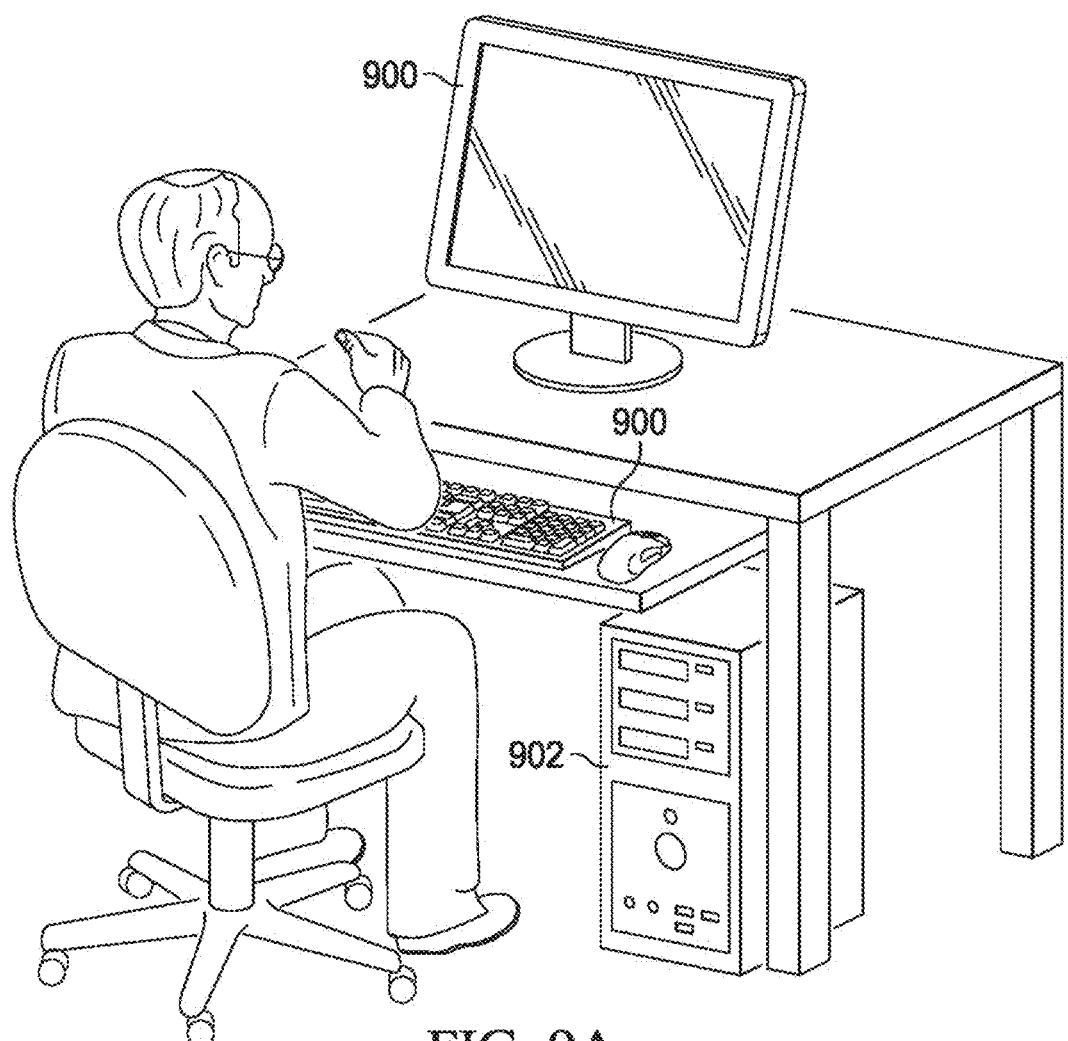
FIG. 9A is a view of a geo-modeler employing an illustrative modeling system.
Figure 9B:
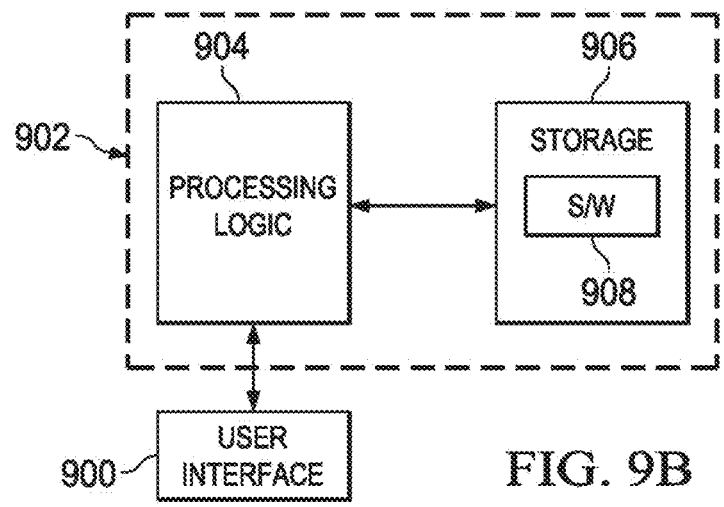
FIG. 9B is a block diagram of a computer system usable to perform the techniques described herein.

A geo-modeler, such as that shown in FIG. 9A, employs a user interface 900 (including a display and one or more input devices) of a workstation 902 to use GPLATES® or an equivalent software to perform the foregoing tectonic model assessments. As FIG. 9B depicts, the workstation 902 couples to the user interface 900 and includes processing logic 904, storage (e.g., non-volatile memory) 906 and software code 908 (e.g., GPLATES® or a similar software package; relevant rotation and polygon files for each tectonic model being assessed; MATLAB® or MICROSOFT EXCEL® for data analysis). The geo-modeler uses the interface 900 to interact with the processing logic 904 as the logic executes the software code 908. The processing logic 904 receives input from the geo-modeler via the one or more input devices (e.g., keyboard, mouse) of the user interface 900 and provides output to the geo-modeler via the display of the user interface 900.

The embodiments described herein are merely illustrative. The scope of this disclosure is not limited to the particular techniques described, nor is any technique limited to the particular embodiment(s) of that technique described. All variations on these techniques are contemplated and included within the scope of the disclosure.

What is claimed is:

1. A method for quantitatively evaluating a plurality of computer-based plate tectonic models for application in a geographic region of interest, comprising:

identifying, with processing logic, said geographic region of interest;

obtaining, from storage, geological data corresponding to said geographic region of interest, wherein said geological data specifies multiple geological parameter values as a function of position in said geographic region of interest;

identifying, with said processing logic, said plurality of computer-based plate tectonic models to analyze said geographic region of interest based on said geological data, wherein a given computer-based plate tectonic model generates geological parameter values based on a given set of geological parameters, wherein said geological parameters indicate a tectonic plate position as a function of time in said geographic region of interest;

applying, with said processing logic, said plurality of computer-based plate tectonic models to said geological data to generate predicted said geological parameter values;

obtaining, from storage, observational geological parameter values corresponding to said geographic region of interest;

quantitatively comparing, with said processing logic, said predicted geological parameter values for each of said plurality of computer-based plate tectonic models to said observational geological parameter values to determine model rankings; and identifying, with said processing logic, a best fit computer-based plate tectonic model from said plurality of computer-based plate tectonic models based on said model rankings.

2. The method of claim 1, further comprising determining an overall ranking of said plurality of computer-based plate tectonic models based on said model rankings and displaying the overall rankings on the computer display.

3. The method of claim 1, wherein quantitatively comparing comprises using a least squares regression technique.

4. The method of claim 1, wherein:
said geological parameters comprise fracture zones,
said predicted geological parameter values comprise flow lines representing a particular fracture zone,
said observational geological parameter values comprise a manually digitized representation of the particular fracture zone, and
quantitatively comparing comprises comparing the flow lines to the manually digitized representation of the particular fracture zone.

5. The method of claim 4, wherein quantitatively comparing comprises determining an error associated with each of the flow lines and using said errors to determine said model rankings.

6. The method of claim 4, further comprising decimating the flow lines prior to quantitatively comparing based on latitude data points used to form the flow lines, longitude data points used to form the flow lines, or a combination thereof.

7. The method of claim 1, wherein:
said geological parameters comprise hot spots,
said predicted geological parameter values comprise predicted hot spot tracks,
said observational geological parameter values comprise an actual hot spot track, and
quantitatively comparing comprises comparing the predicted hot spot tracks and the actual hot spot tracks.

8. The method of claim 1, wherein:
said geological parameters comprise crustal thickness,
said predicted geological parameter values comprise average crustal thicknesses of a pre-rift area calculated using simulated repositioning of a continental crust toward a rift,
said observational geological parameter values comprise an average present-day thickness of the continental crust, and
quantitatively comparing comprises comparing the average crustal thicknesses of the pre-rift area to the average present-day thickness of the continental crust.

9. The method of claim 1, wherein:
said geological parameters comprise continental deformation,
said predicted geological parameter values comprise predicted deformations on a continent, said predicted deformations identified by superimposing shapes upon a representation of the continent,
said observational geological parameter values comprise an actual deformation on said continent, and
quantitatively comparing comprises comparing the predicted and actual deformations.

10. The method of claim 9, further comprising modeling a paleogeography of the representation of the continent after superimposing said shapes upon the representation of the continent.

11. The method of claim 10, further comprising identifying a deformation in one or more of said shapes after modeling the paleogeography and comparing said deformation to observational intracratonal deformation data.

12. The method of claim 1, wherein:
said geological parameters comprise paleolatitudes,
said predicted geological parameter values comprise predicted latitudinal movements of a geological feature,
said observational geological parameter values comprise actual latitudinal movement of the geological feature obtained using paleomagnetic properties associated with said geological feature, and
quantitatively comparing comprises comparing the predicted and actual latitudinal movements of said geological feature.

13. The method of claim 12, wherein said geological feature comprises a plate and wherein said paleomagnetic properties are determined using a rock associated with said plate.

14. The method of claim 1, wherein:
said geological parameters comprise rift age,
said predicted geological parameter values comprise predicted ages of a rift,
said observational geological parameter values comprise actual age of the rift, and
quantitatively comparing comprises comparing the predicted and actual ages of the rift.

15. The method of claim 14, further comprising determining the predicted ages of the rift by calculating differences between velocity vectors of plates associated with the rift.

16. A non-transitory computer-readable storage medium comprising software code which, when executed by a processor, causes the processor to:
identify a geographic region of interest;
obtain, from storage, geological data corresponding to said geographic region of interest, wherein said geological data specifies multiple geological parameter values as a function of position in said geographic region of interest;
identifying, with said processing logic, said plurality of computer-based plate tectonic models to analyze said geographic region of interest based on said geological data, wherein a given computer-based plate tectonic model generates geological parameter values based on a given set of geological parameters, wherein said geological parameters indicate a tectonic plate position as a function of time in said geographic region of interest;
applying said plurality of plate tectonic models to said geological data to generate predicted said geological parameter values generate predicted geological parameter values;

obtaining, from storage, observational geological parameter values corresponding to said geographic region of interest;

quantitatively compare said predicted geological parameter values for each of said plurality of computer-based plate tectonic models to said observational geological parameter values to determine model rankings;

identify a best fit plate tectonic model from said plurality of computer-based plate tectonic models based on an overall ranking.

17. The storage medium of claim 16, wherein quantitatively comparing comprises using a least squares regression technique.

18. The storage medium of claim 16, wherein the processor determines said model rankings for each of said plurality of geological parameters by applying weights to said plurality of geological parameters.

19. A method for selecting one of a plurality of plate tectonic models to assess a geographic region, comprising:

identifying, with processing logic, said geographic region;

obtaining, from storage, geological data corresponding to said geographic region of interest, wherein said geological data specifies multiple geological parameter values as a function of position in said geographic region of interest;

identifying said plurality of plate tectonic models to analyze said geographic region of interest based on said geological data, wherein a given computer-based plate tectonic model generates geological parameter values based on a given set of geological parameters, wherein said geological parameters indicate a tectonic plate position as a function of time in said geographic region;

applying, with said processing logic, said plurality of plate tectonic models to said geological data to generate predicted said geological parameter values;

obtaining, from said storage, observational geological parameter values corresponding to said geographic region of interest quantitatively comparing, with said processing logic, said predicted geological parameter values for each of said plurality of computer-based plate tectonic models to said observational geological parameter values to determine model rankings;

identifying, with said processing logic, a best fit computer-based plate tectonic model from said plurality of computer-based plate tectonic models based on said model rankings.

* * * * *